US008779323B2

(12) United States Patent
Ashtekar et al.

(10) Patent No.: US 8,779,323 B2
(45) Date of Patent: Jul. 15, 2014

(54) ELECTRODE FOR PLASMA TORCH WITH NOVEL ASSEMBLY METHOD AND ENHANCED HEAT TRANSFER

(71) Applicant: The ESAB Group, Inc., Florence, SC (US)

(72) Inventors: Koustubh D. Ashtekar, Florence, SC (US); David C. Griffin, Florence, SC (US); Gregory W. Diehl, Florence, SC (US); Dale T. Wiersema, Florence, SC (US)

(*) Notice: Subject to any disclaimer, the term of this patent is extended or adjusted under 35 U.S.C. 154(b) by 0 days.

(21) Appl. No.: 14/108,816

(22) Filed: Dec. 17, 2013

(65) Prior Publication Data

US 2014/0103017 A1     Apr. 17, 2014

Related U.S. Application Data

(63) Continuation of application No. 12/957,695, filed on Dec. 1, 2010, now Pat. No. 8,633,417.

(51) Int. Cl.
| | | |
|---|---|---|
| *B23K 10/00* | (2006.01) | |
| *B23K 35/00* | (2006.01) | |
| *H05H 1/28* | (2006.01) | |
| *H05H 1/34* | (2006.01) | |

(52) U.S. Cl.
CPC ........ *B23K 35/00* (2013.01); *H05H 2001/3478* (2013.01); *H05H 2001/3436* (2013.01); *H05H 1/34* (2013.01); *H05H 1/28* (2013.01)
USPC ............. 219/121.52; 219/121.49; 219/121.59

(58) Field of Classification Search
CPC ....................................................... H05H 1/28
USPC ................. 219/121.52, 121.48, 119, 121.39, 219/121.59
See application file for complete search history.

(56) References Cited

U.S. PATENT DOCUMENTS

| | | | | |
|---|---|---|---|---|
| 5,023,425 | A * | 6/1991 | Severance, Jr. ........... | 219/121.59 |
| 6,329,627 | B1 * | 12/2001 | Walters .................... | 219/121.52 |
| 8,525,069 | B1 * | 9/2013 | Mather et al. ............. | 219/121.52 |
| 2011/0253683 | A1 * | 10/2011 | Twarog et al. ........... | 219/121.52 |

* cited by examiner

*Primary Examiner* — Mark Paschall
(74) *Attorney, Agent, or Firm* — Kacvinsky Daisak Bluni PLLC

(57) ABSTRACT

Embodiments of the present invention are related to an electrode for a plasma arc torch, the electrode comprising a generally tubular outer wall, an end wall, and a protrusion. The end wall is joined to a distal end of the outer wall and supports an emissive element in a generally central region. The protrusion extends from the generally central region of the end wall and is configured to connect with an electrode holder by a releasable connection, wherein the protrusion is configured such that at least one coolant passage forms between the protrusion and the electrode holder when the electrode is connected with the electrode holder. In some embodiments, the releasable connection comprises a threaded connection, wherein the protrusion is threaded to releasably connect to a threaded coolant tube of the electrode holder. In other embodiments, at least one coolant passage is defined by the threaded connection.

20 Claims, 15 Drawing Sheets

ELECTRODE FOR PLASMA TORCH WITH NOVEL ASSEMBLY METHOD AND ENHANCED HEAT TRANSFER

CROSS-REFERENCE TO RELATED APPLICATIONS

This is a continuation application of pending U.S. patent application Ser. No. 12/957,695, filed Dec. 1, 2010, the entirety of which application is incorporated by reference herein.

FIELD

Embodiments of the present invention relate to electrode assemblies for plasma arc torches and, in particular, to electrodes and electrode holders held to each other or to the plasma arc torch by way of a threaded connection. Further, some embodiments relate to electrode assemblies having defined passages for providing coolant to the electrode.

BACKGROUND

Plasma arc torches are commonly used for the working of metal including cutting, welding, surface treatment, melting and annealing. Such torches include an electrode that supports an arc that extends from the electrode to a workpiece in a transferred-arc mode of operation. To facilitate operation, current is passed to the electrode to create the arc, which heats the electrode to high temperatures, causing erosion and reduction in electrode life. Thus, it is conventional to surround the arc with a vortex flow of plasma gas, and in some torch designs the plasma gas and arc are surrounded by a flow of secondary fluid such as a gas or water.

SUMMARY OF THE INVENTION

In an effort to improve the electrode life and reduce manufacturing costs, embodiments of the present invention provide an electrode for a plasma arc torch with novel assembly method and enhanced heat transfer properties.

One example embodiment is an electrode for a plasma arc torch, the electrode comprising a generally tubular outer wall, an end wall, and a protrusion. The end wall is joined to a distal end of the outer wall and supports an emissive element in a generally central region of the end wall. The protrusion extends from the generally central region of the end wall and is configured to connect with an electrode holder by a releasable connection, wherein the protrusion is configured such that at least one coolant passage forms between the protrusion and the electrode holder when the electrode is connected with the electrode holder. In some embodiments, the releasable connection may comprise a threaded connection and the protrusion may be threaded to releasably connect the protrusion to a threaded coolant tube of the electrode holder. In other embodiments at least one coolant passage may be defined by the threaded connection.

Another embodiment of the present invention is a plasma arc torch comprising a torch body, a nozzle supported adjacent one end of the torch body, an electrode, and an electrode holder. The electrode holder is supported by the torch body and is configured to provide coolant through an interior of the electrode holder. The electrode comprises an end wall that supports an emissive element and a protrusion extending from a generally central region of the end wall. The protrusion connects to the electrode holder by a releasable connection, wherein at least one coolant passage is formed between the protrusion and the electrode holder. The at least one coolant passage allows coolant to flow therethrough and impinge on the end wall of the electrode. In some embodiments, the releasable connection comprises a threaded connection and the protrusion may be threaded to releasably connect to a threaded coolant tube of the electrode holder. In other embodiments, the at least one coolant passage is defined by the threaded connection.

Other embodiments of the present invention include an electrode assembly for a plasma arc torch. The electrode assembly comprising an electrode and an electrode holder. The electrode comprises a generally tubular outer wall, an end wall joined to a distal end of the outer wall and supporting an emissive element in a generally central region of the end wall, and a protrusion extending from the generally central region of the end wall. The electrode holder connects to the electrode by a releasable connection and comprises an inner coolant tube for providing coolant to the electrode and an outer coolant tube surrounding the inner coolant tube for removing coolant from the electrode via a space between the inner and outer coolant tubes. The protrusion of the electrode is configured to connect with the inner coolant tube of the electrode holder by a releasable connection and at least one coolant passage forms between the protrusion of the electrode and the inner coolant tube of the electrode holder when the electrode is connected with the electrode holder. In some embodiments, the releasable connection comprises a threaded connection and the protrusion may be threaded to releasably connect the protrusion to a threaded coolant tube of the electrode holder. In other embodiments, the at least one coolant passage is defined by the threaded connection.

Another embodiment of the present invention is a method for cooling an electrode in a plasma arc torch, comprising the steps of connecting an electrode to an electrode holder by a releasable connection therebetween. The electrode has an end wall supporting an emissive element and a protrusion extending from a generally central region of the end wall, wherein the protrusion is configured to connect with the electrode holder by the releasable connection. The method further comprises providing coolant through a coolant tube of the electrode holder and through at least one coolant passage defined by the releasable connection such that the end wall of the electrode is impinged by the coolant.

BRIEF DESCRIPTION OF THE DRAWINGS

Figure 1:
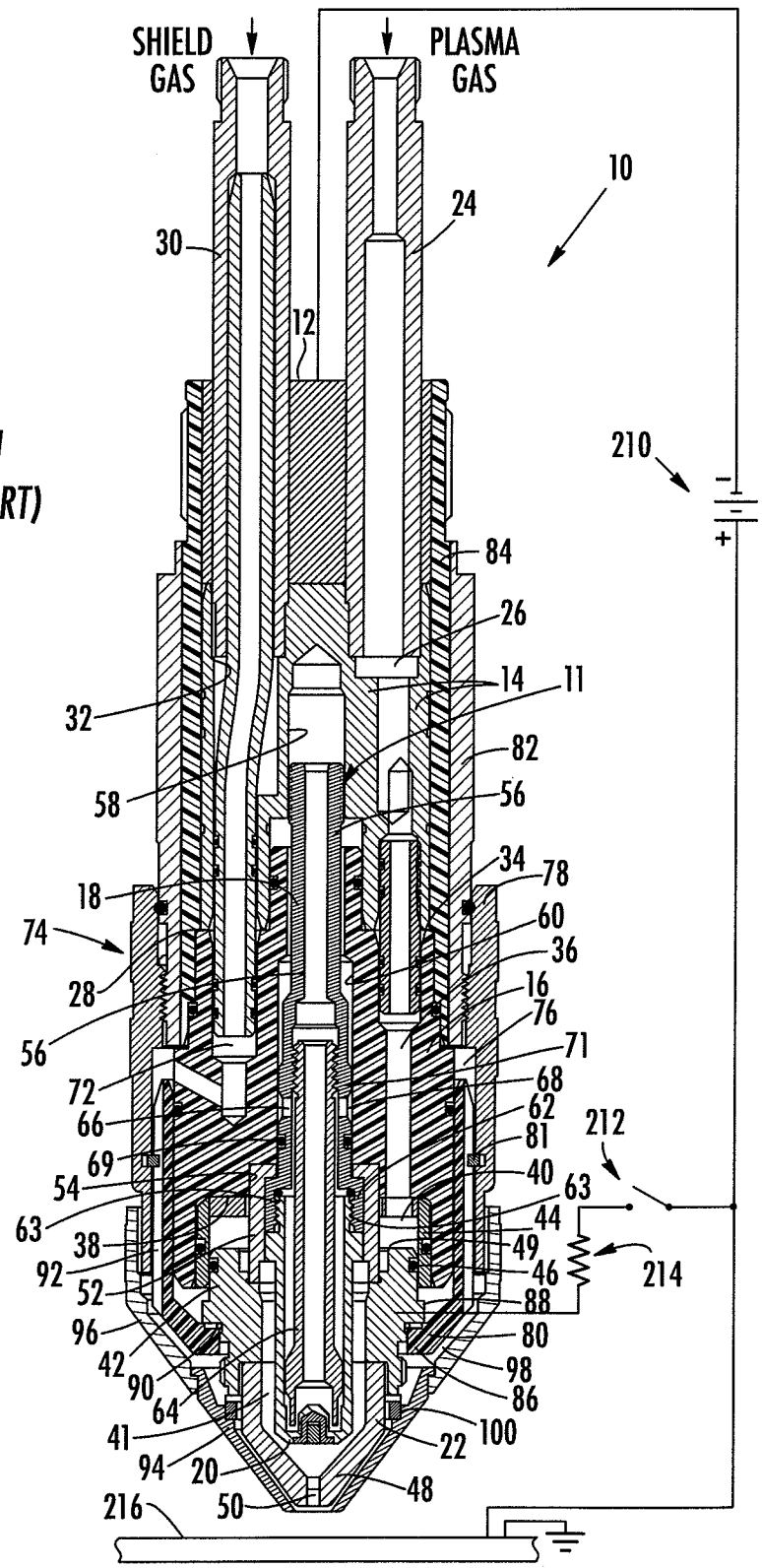
Figure 2:
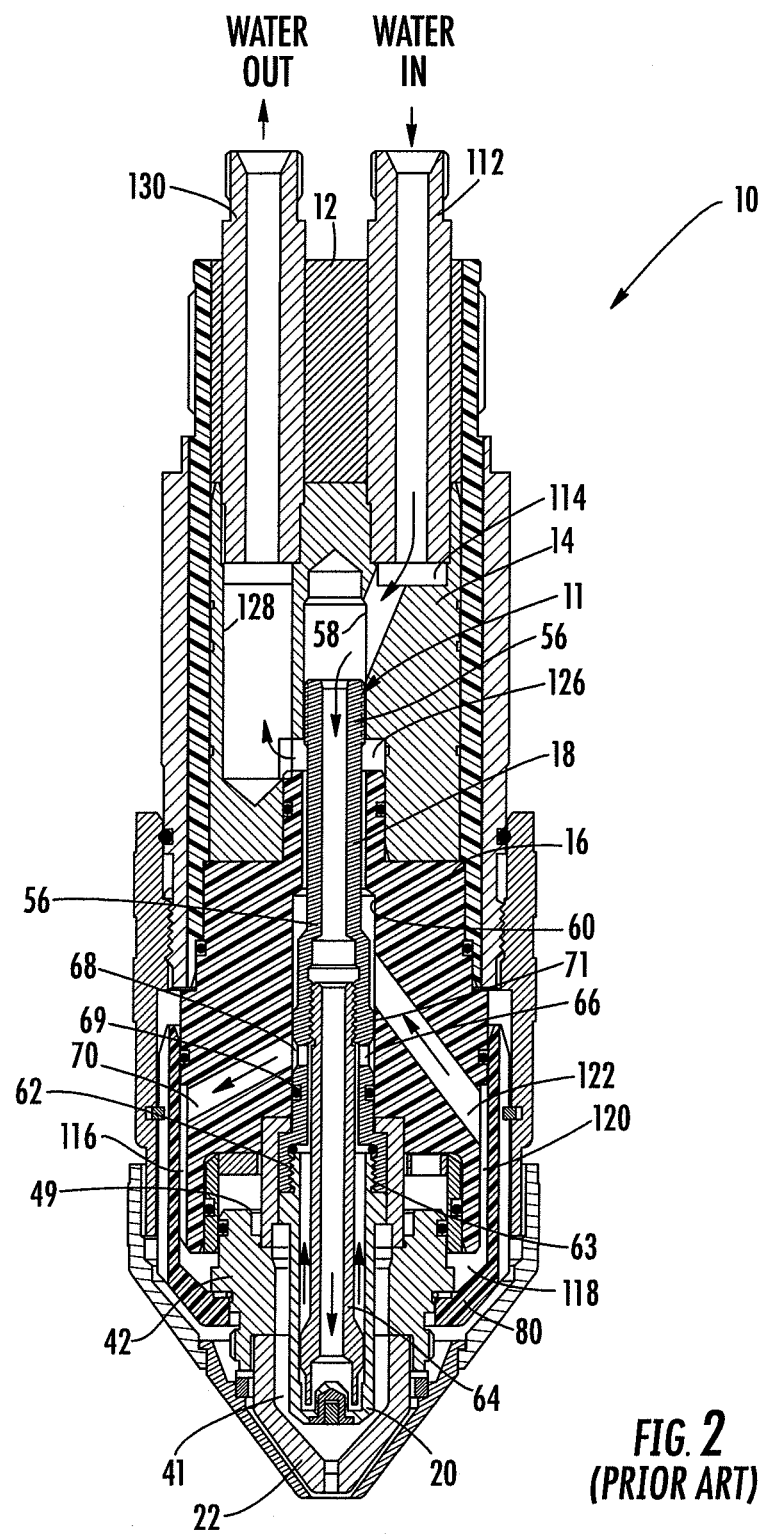
Figure 3:
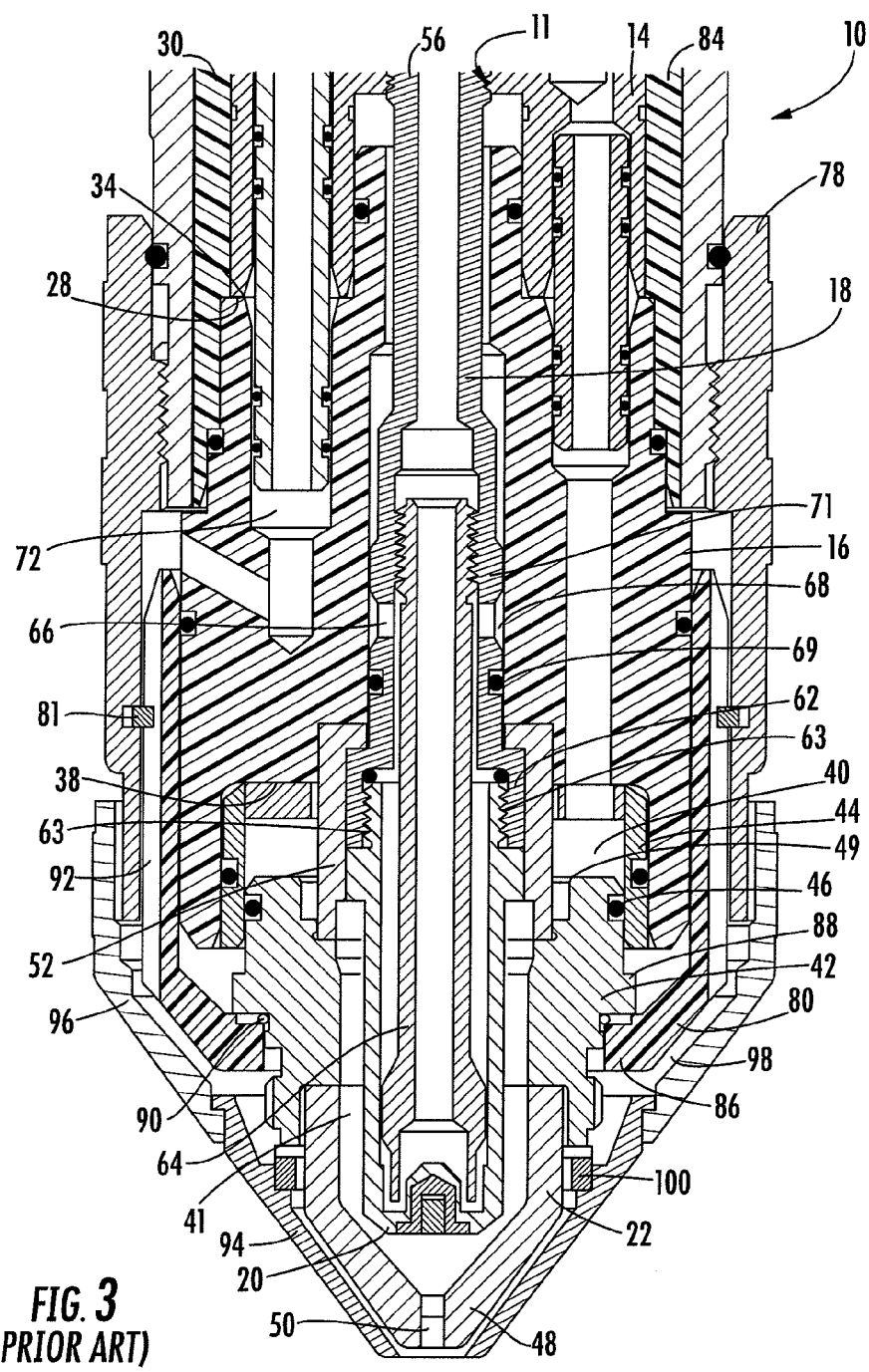
Figure 4:
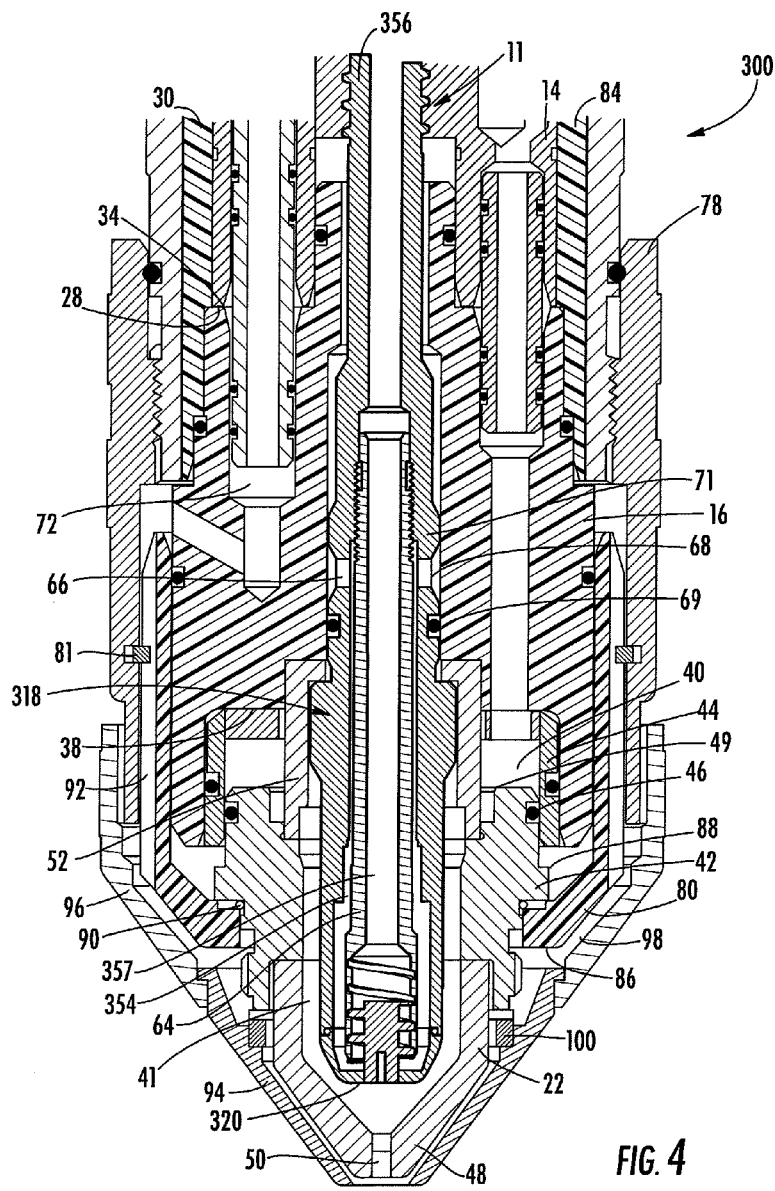
Figure 5:
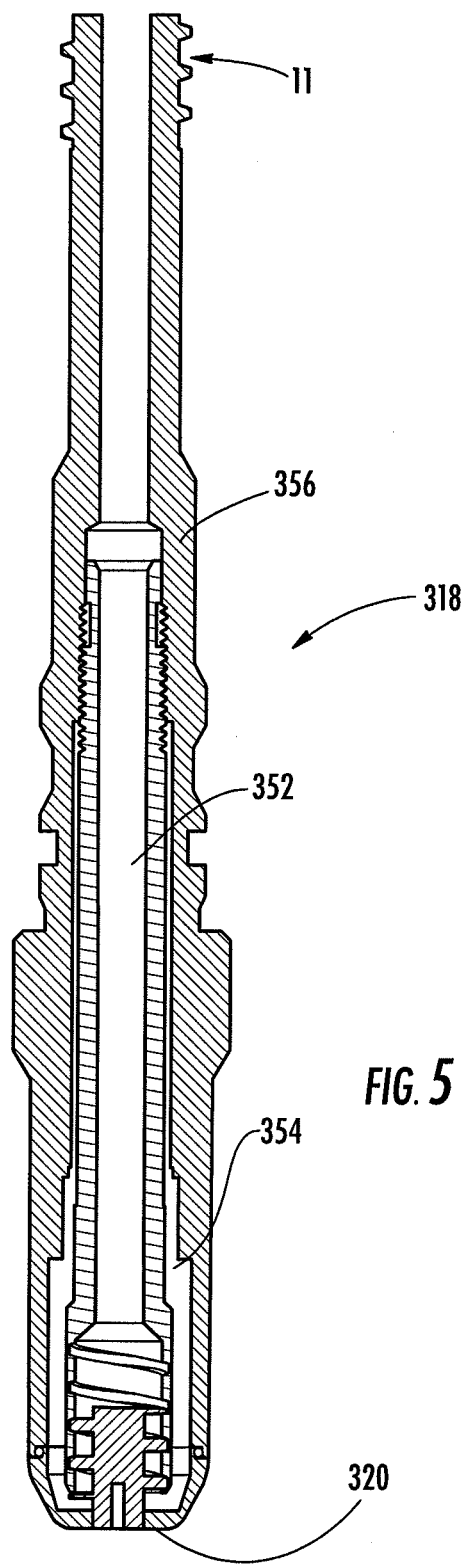
Figure 6:
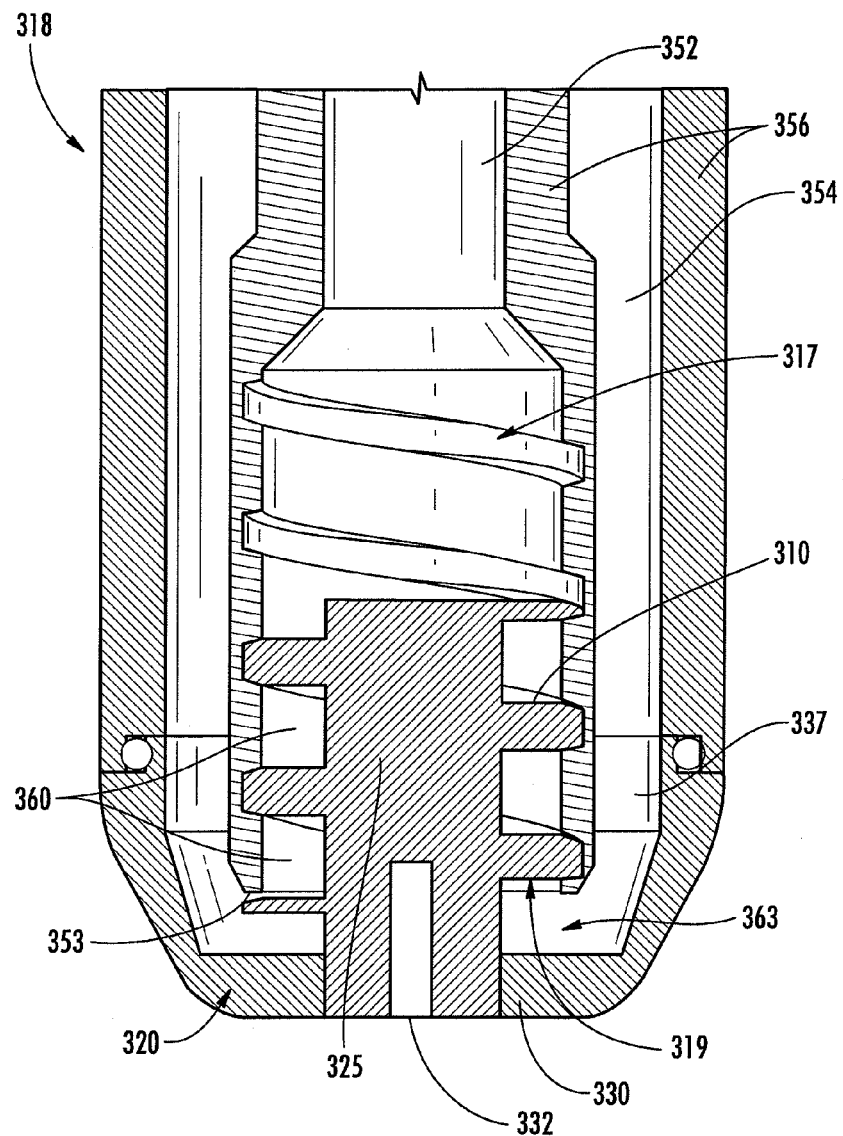
Figure 7:
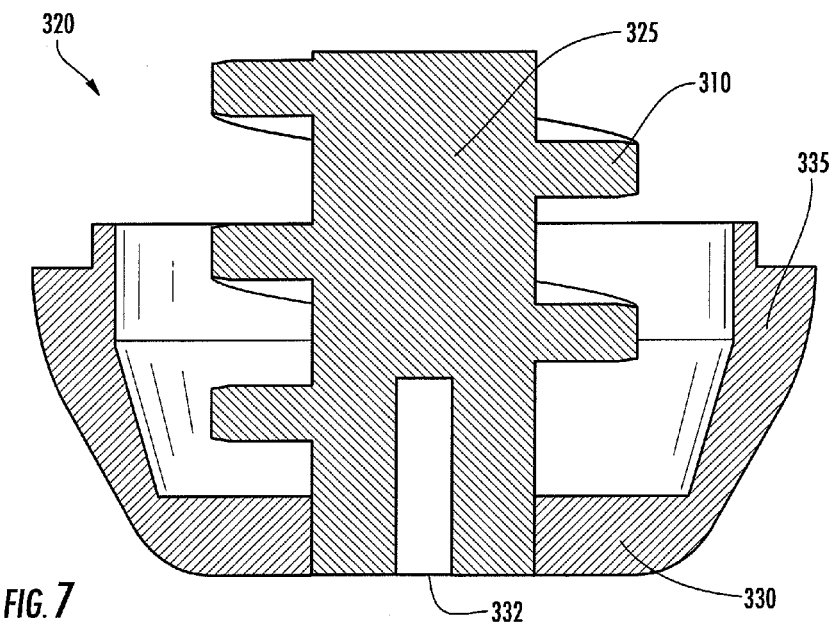
Figure 7A:
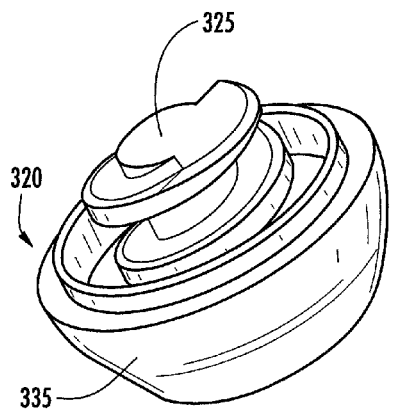
Figure 8:
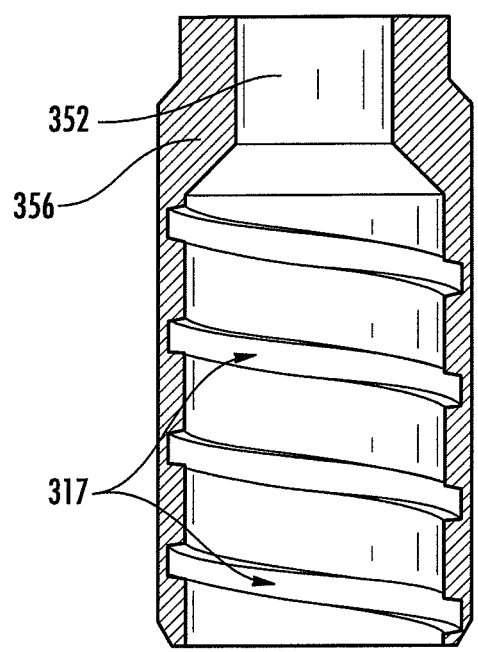
Figure 9:
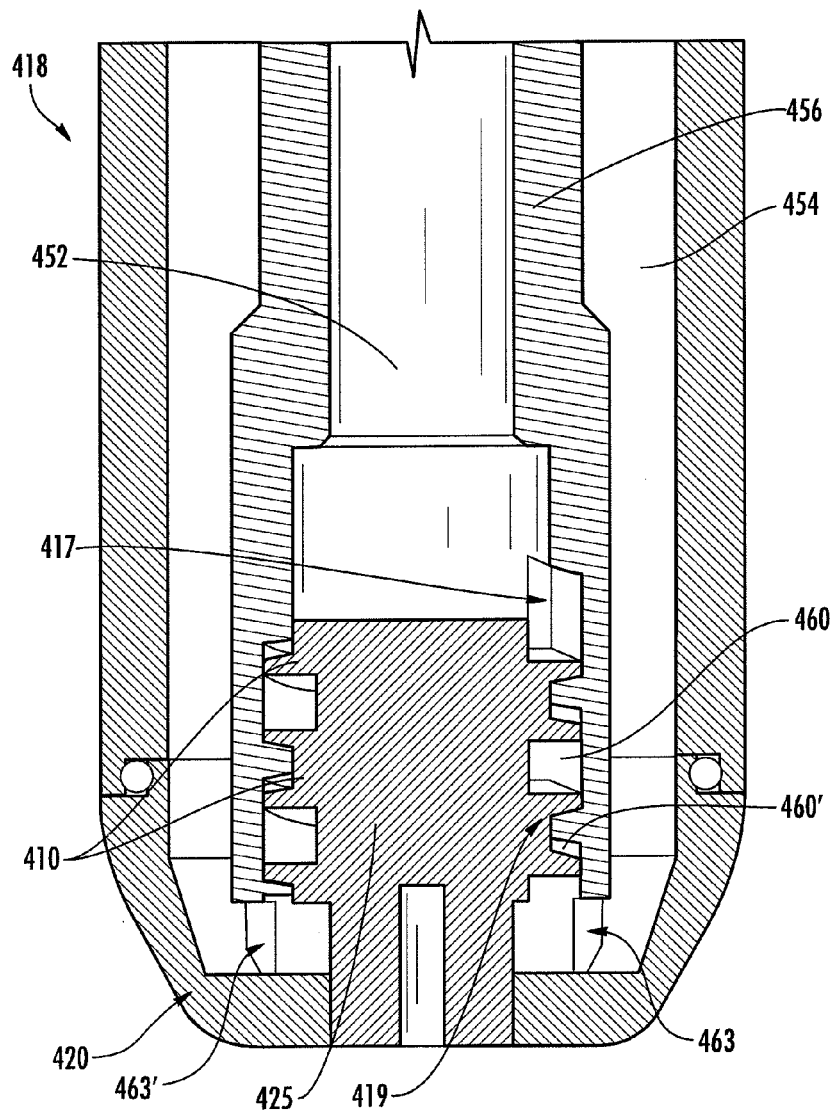
Figure 10:
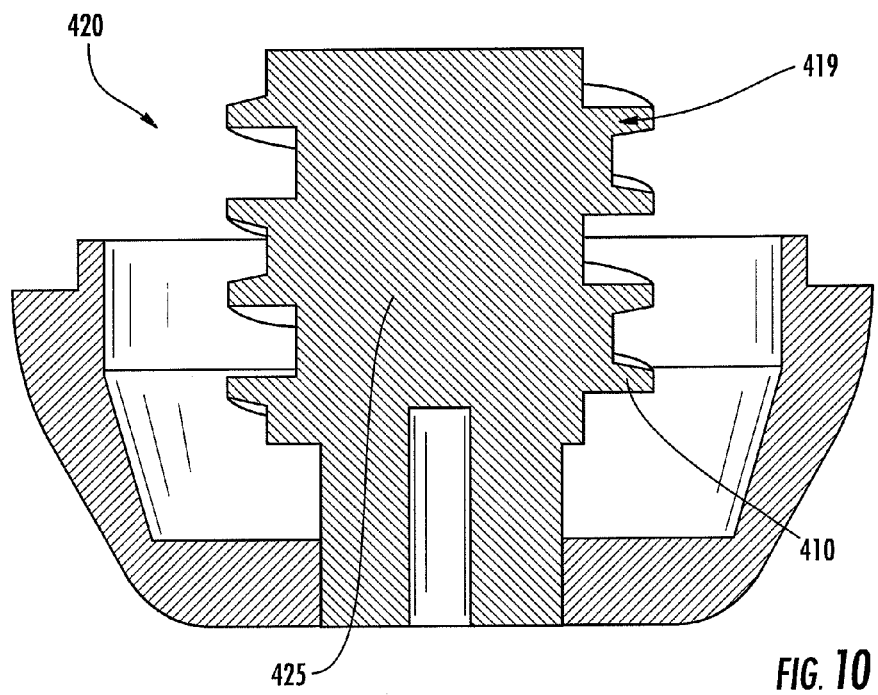
Figure 10A:
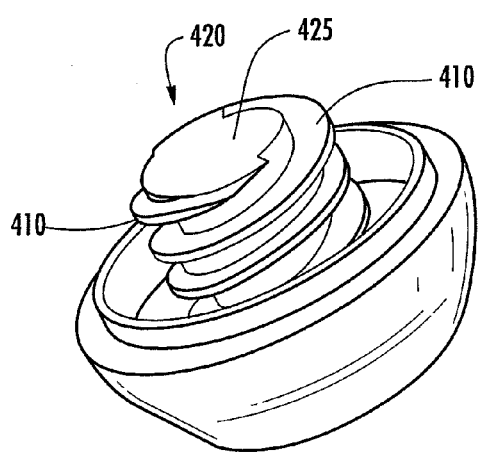
Figure 11:
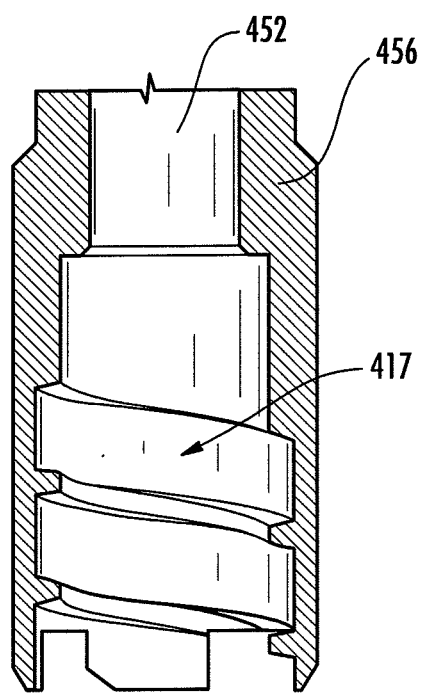
Figure 12:
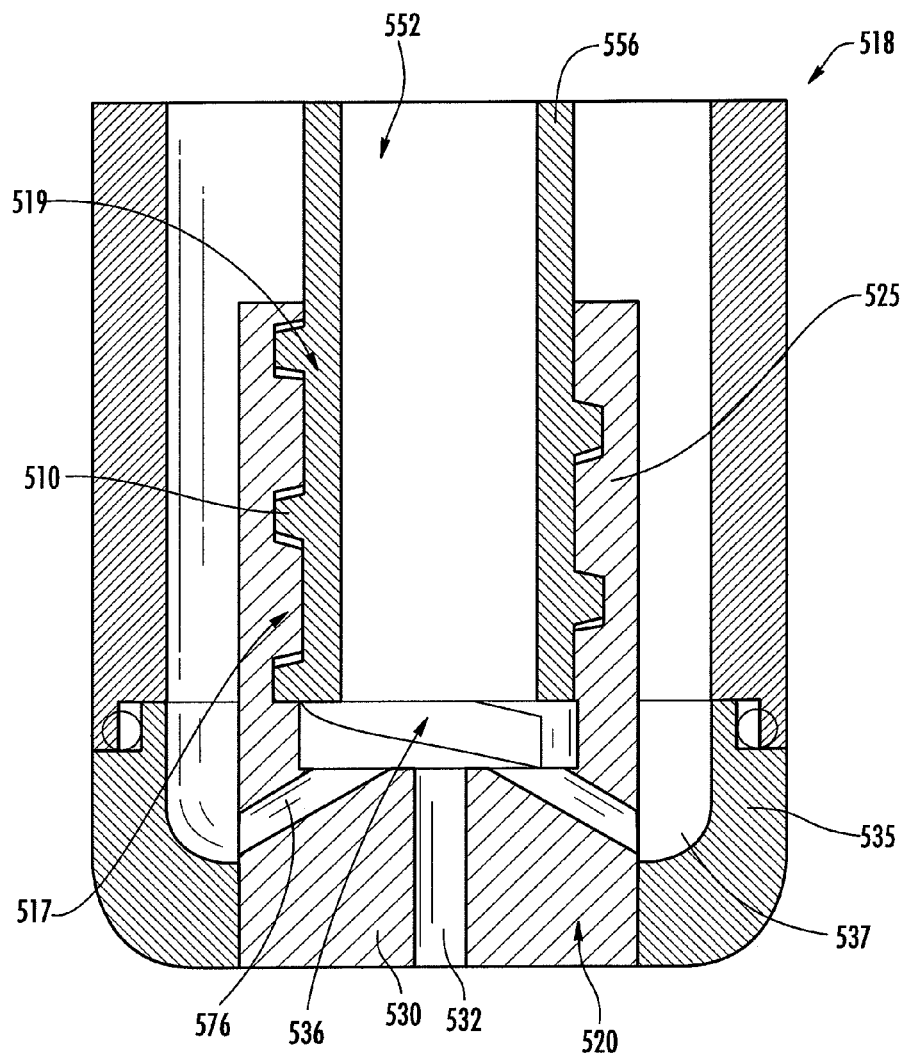
Figure 13:
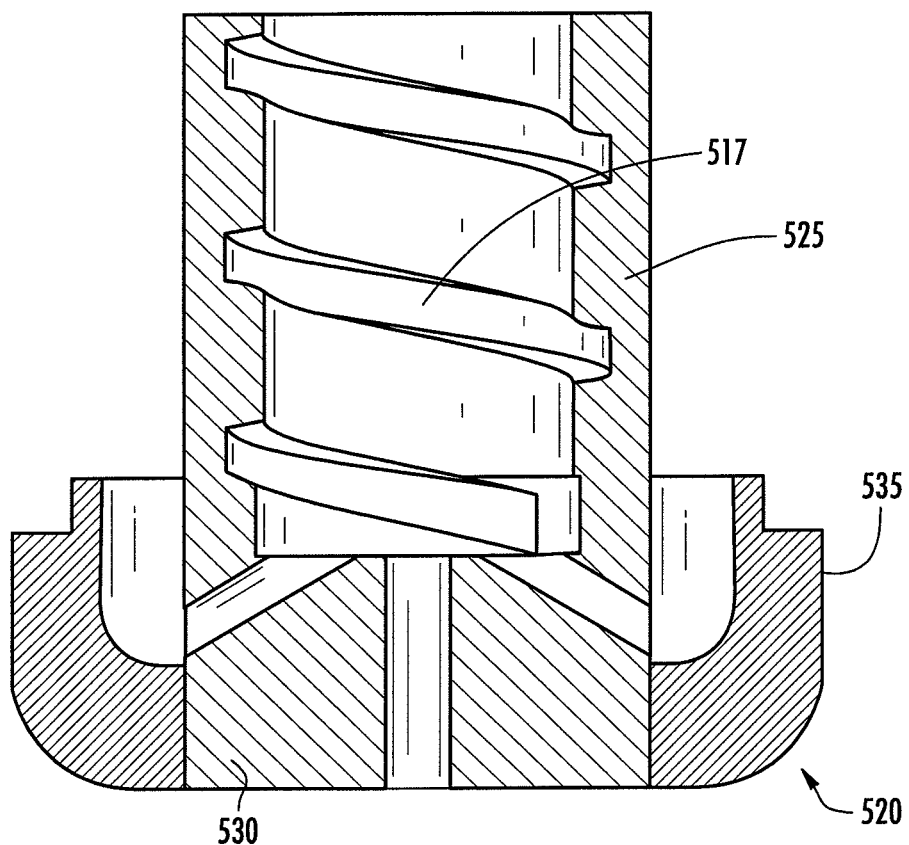
Figure 13A:
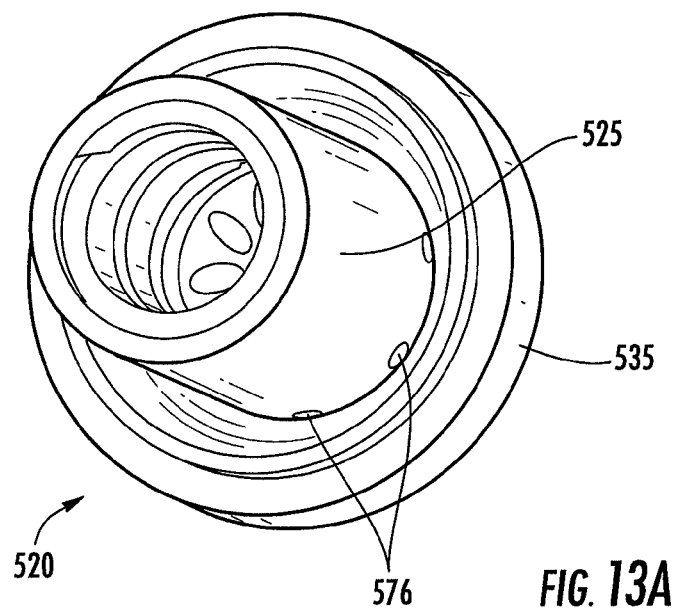
Figure 14:
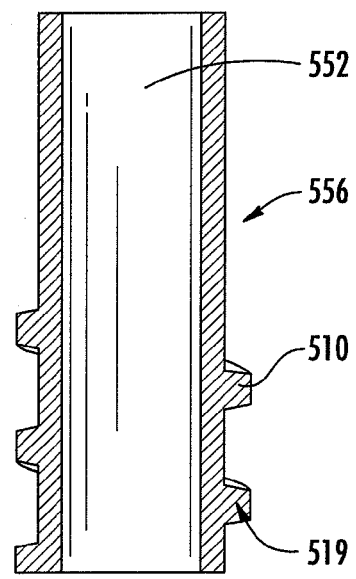
Figure 15:
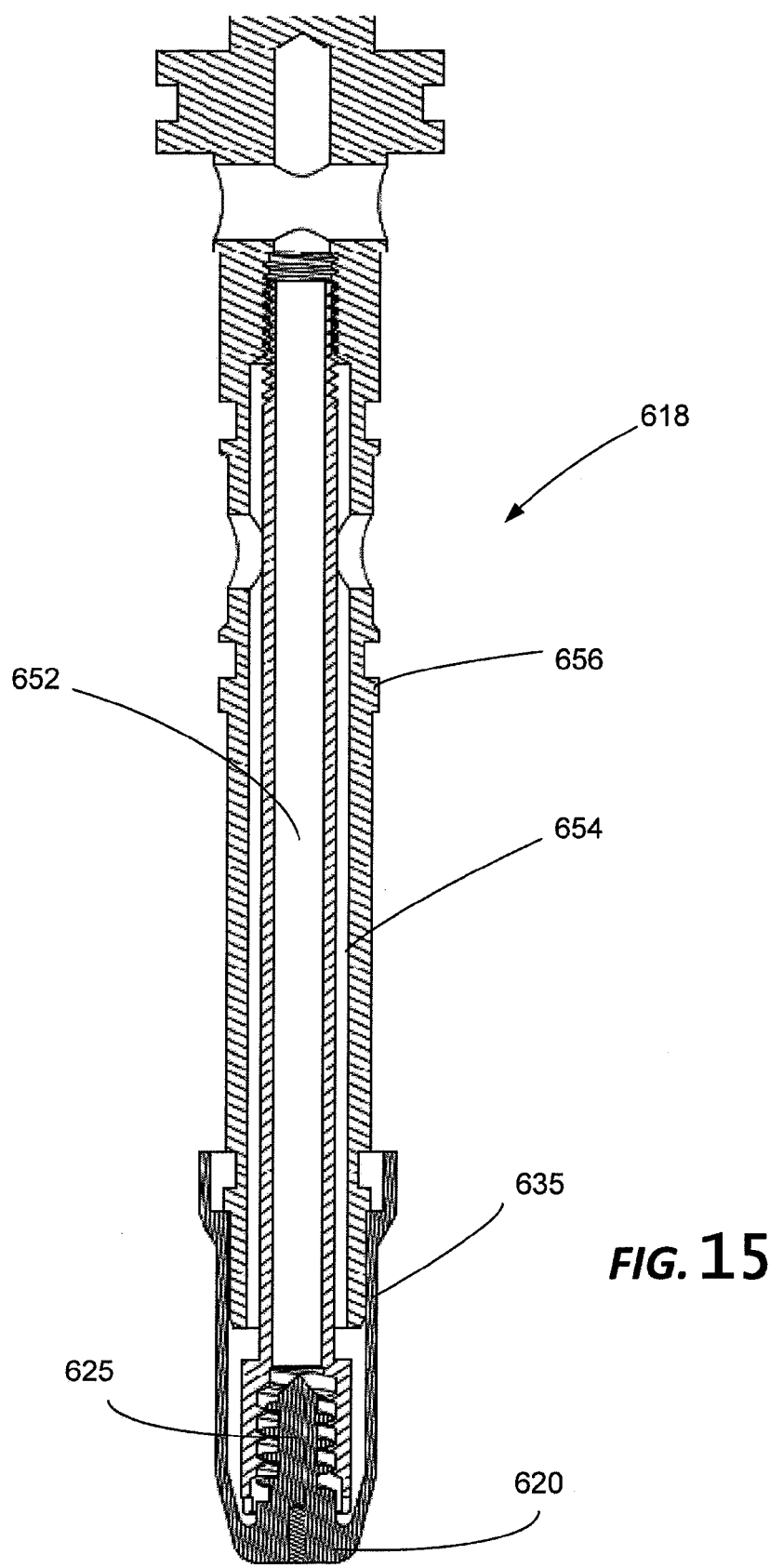

Having thus described the invention in general terms, reference will now be made to the accompanying drawings, which are not necessarily drawn to scale, and wherein:

FIG. 1 is a cross-sectioned side view of a conventional shielding gas plasma arc torch illustrating an electrode assembly as used in the prior art;

FIG. 2 is a cross-sectioned side view of the torch taken along a different section from FIG. 1 to illustrate coolant flow therethrough;

FIG. 3 is an enlarged cross-sectioned view of the lower portion of the torch as seen in FIG. 1 and illustrating the conventional electrode assembly;

FIG. 4 is an enlarged cross-sectioned view of the lower portion of a plasma arc torch illustrating one example embodiment of an electrode assembly, in accordance with some embodiments discussed herein;

FIG. 5 is a cross-sectioned view of the electrode assembly of FIG. 4, in accordance with some embodiments discussed herein;

FIG. 6 is an enlarged cross-sectioned view of the lower portion of the electrode assembly of FIG. 4, in accordance with some embodiments discussed herein;

FIG. 7 is an enlarged cross-sectioned view of an electrode of the electrode assembly of FIG. 4, in accordance with some embodiments discussed herein;

FIG. 7A is a perspective view of the electrode of FIG. 7, in accordance with some embodiments discussed herein;

FIG. 8 is an enlarged cross-sectioned view of the lower portion of an electrode holder of the electrode assembly of FIG. 4, in accordance with some embodiments discussed herein;

FIG. 9 is an enlarged cross-sectioned view of the lower portion of another example embodiment of an electrode assembly, in accordance with some embodiments discussed herein;

FIG. 10 is an enlarged cross-sectioned view of an electrode of the electrode assembly of FIG. 9, in accordance with some embodiments discussed herein;

FIG. 10A is a perspective view of the electrode of FIG. 10, in accordance with some embodiments discussed herein;

FIG. 11 is an enlarged cross-sectioned view of the lower portion of an electrode holder of the electrode assembly of FIG. 9, in accordance with some embodiments discussed herein;

FIG. 12 is an enlarged cross-sectioned view of the lower portion of another embodiment of an electrode assembly, in accordance with some embodiments discussed herein;

FIG. 13 is an enlarged cross-sectioned view of an electrode of the electrode assembly of FIG. 12, in accordance with some embodiments discussed herein;

FIG. 13A is a perspective view of the electrode of FIG. 13, in accordance with some embodiments discussed herein;

FIG. 14 is an enlarged cross-sectioned view of an electrode holder of the electrode assembly of FIG. 12, in accordance with some embodiments discussed herein; and FIG. 15 is a cross-sectioned view of another embodiment of an electrode assembly, in accordance with some embodiments discussed herein.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Plasma arc torches often utilize electrodes that comprise an elongate tubular member composed of a material of high thermal conductivity (e.g., copper, copper alloy, silver, etc.) The forward or discharge end of the tubular electrode includes a bottom end wall having an emissive element embedded therein that supports the arc. The opposite end of the electrode holds the electrode in the torch by way of a releasable connection (e.g., threaded connection) to an electrode holder. The electrode holder is typically an elongate structure held to the torch body by a threaded connection at an end opposite the end at which the electrode is held. The electrode holder and the electrode define a threaded connection for holding the electrode to the electrode holder.

The emissive element of the electrode is composed of a material that has a relatively low work function, which is defined in the art as the potential step, measured in electron volts (eV), which promotes thermionic emission from the surface of a metal at a given temperature. In view of this low work function, the element is thus capable of readily emitting electrons when an electrical potential is applied thereto. Commonly used emissive materials include hafnium, zirconium, tungsten, and alloys thereof.

A nozzle surrounds the discharge end of the electrode and provides a pathway for directing the arc towards the workpiece. To ensure that the arc is emitted through the nozzle and not from the nozzle surface during regular, transferred-arc operation, the electrode and the nozzle are maintained at different electrical potential relative to each other. Thus, it is important that the nozzle and the electrode are electrically separated, and this is typically achieved by maintaining a predetermined physical gap between the components. The volume defining the gap is most typically filled with flowing air or some other gas used in the torch operation.

The heat generated by the plasma arc is great. The torch component that is subjected to the most intense heating is the electrode. To improve the service life of a plasma arc torch, it is generally desirable to maintain the various components of the torch at the lowest possible temperature notwithstanding this heat generation. In some torches, a passageway or bore is formed through the electrode holder, and a coolant such as water is circulated through the passageway to internally cool the electrode.

Even with the water-cooling, the electrode has a limited life span and is considered a consumable part. Thus, in the normal course of operation, a torch operator must periodically replace a consumed electrode by first removing the nozzle and then unthreading the electrode from the electrode holder. A new electrode is then screwed onto the electrode holder and the nozzle is reinstalled so that the plasma arc torch can resume operation.

Other considerations for electrode design include constraints on the threaded connection between the electrode holder and the electrode. For example, the threaded connection must be structurally strong enough to securely hold the electrode to the electrode holder. Additionally, a considerable current is passed through the electrode holder to the electrode, in some cases up to 1,000 amperes of cutting current. Thus, the threaded connection should provide sufficient contact surface area between the electrode and the electrode holder to allow this current to pass through. Finally, the cost of manufacturing the electrode should be as small as possible, especially because the electrode is a frequently replaced consumable part.

Thus, there is a need to increase the useful life of the electrode by more efficient ways to provide coolant, while maintaining low cost of manufacture for the electrode and electrode holder.

The following discussion with respect to FIGS. 1-3 describes a prior plasma arc torch that would benefit from the invention. A plasma arc torch 300 using an electrode and electrode holder according to some embodiments of the present invention is illustrated in FIG. 4. Thus, embodiments of the present invention are described in greater detail with respect to FIGS. 4-15.

FIGS. 1-3 show a prior plasma arc torch 10. The torch 10 is a shielding gas torch, which provides a swirling curtain or jet of shielding gas surrounding the electric arc during a working mode of operation of the torch. The torch 10 includes a generally cylindrical upper or rear insulator body 12 which may be formed of a potting compound or the like, a generally cylindrical main torch body 14 connected to the rear insulator body 12 and generally made of a conductive material such as metal, a generally cylindrical lower or front insulator body 16 connected to the main torch body 14, an electrode holder assembly 18 extending through the main torch body 14 and front insulator body 16 and supporting an electrode 20 at a free end of the electrode holder assembly, and a nozzle assembly 22 connected to the insulator body 16 adjacent the electrode 20.

A plasma gas connector tube 24 extends through the rear insulator body 12 and is connected by screw threads (not shown) into a plasma gas passage 26 of the main torch body 14. The plasma gas passage 26 extends through the main torch body 14 to a lower end face 28 thereof for supplying a plasma gas (sometimes referred to as a cutting gas), such as oxygen, air, nitrogen, or argon, to a corresponding passage in the insulator body 16.

A shielding gas connector tube 30 extends through the rear insulator body 12 and is connected by screw threads into a shielding gas passage 32 of the main torch body 14. The shielding gas passage 32 extends through the main torch body 14 to the lower end face 28 for supplying a shielding gas, such as argon or air, to a corresponding passage in the insulator body 16.

The insulator body 16 has an upper end face 34 that abuts the lower end face 28 of the main torch body. A plasma gas passage 36 extends through the insulator body 16 from the upper end face 34 into a cylindrical counterbore 38 in the lower end of the insulator body 16. As further described below, the counterbore 38, together with the upper end of the nozzle assembly 22, forms a plasma gas chamber 40 from which plasma gas is supplied to a primary or plasma gas nozzle of the torch. As such, plasma gas from a suitable source enters the plasma gas chamber 40 by flowing through the plasma gas connector tube 24, through the plasma gas passage 26 in the main torch body 14, into the plasma gas passage 36 of the insulator body 16, which is aligned with the passage 26, and into the chamber 40.

The nozzle, which is illustrated as a two-part nozzle assembly 22, includes an upper nozzle member 42, which has a generally cylindrical upper portion slidingly received within a metal insert sleeve 44 that is inserted into the counterbore 38 of the insulator body 16. An O-ring 46 seals the sliding interconnection between the upper nozzle member 42 and the metal insert sleeve 44. A lower nozzle tip 48 of generally frustoconical form also forms a part of the nozzle assembly 22, and is threaded into the upper nozzle member 42. The lower nozzle tip 48 includes a nozzle exit orifice 50 at the tip end thereof. The lower nozzle tip 48 and upper nozzle member 42 could alternatively be formed as one unitary nozzle. In either configuration, the nozzle channels the plasma gas from a larger distal opening 49 to the exit orifice 50. A plasma gas flow path thus exists from the plasma gas chamber 40 through the nozzle chamber 41 for directing a jet of plasma gas out the nozzle exit orifice 50 to aid in performing a work operation on a workpiece.

The plasma gas jet preferably has a swirl component created, in a known manner, by a hollow cylindrical ceramic gas baffle 52 partially disposed in a counterbore recess 54 of the insulator body 16. A lower end of the baffle 52 abuts an annular flange face of the upper nozzle member 42. The baffle 52 has non-radial holes (not shown) for directing plasma gas from the plasma gas chamber 40 into a lower portion of the nozzle chamber 41 with a swirl component of velocity.

The electrode holder assembly 18 includes a tubular electrode holder 56 which has its upper end connected by threads 11 within a blind axial bore 58 in the main torch body 14. The electrode holder 56 is somewhat consumable, although usually less so than the electrode itself, and thus the electrode holder and the axial bore 58 can also be provided with a threaded connection according to the present invention as discussed below. The upper end of electrode holder 56 extends through an axial bore 60 formed through the insulator body 16, and the lower end of the electrode holder 56 includes an enlarged internally screw-threaded coupler 62 which has an outer diameter slightly smaller than the inner diameter of the ceramic gas baffle 52 which is sleeved over the outside of the coupler 62. The electrode holder 56 also includes internal screw threads spaced above the coupler 62 for threadingly receiving a coolant tube 64 which supplies coolant to the electrode 20, as further described below, and which extends outward from the axial bore of the insulator body 16 into the central passage of the electrode 20. To prevent improper disassembly or reassembly of the coolant tube 64 and the electrode holder 56, the screw thread connection between those items may be cemented or otherwise secured together during manufacture to form an inseparable electrode holder assembly 18. The electrode 20 may be of the type described in U.S. Pat. No. 5,097,111, assigned to the assignee of the present application, and incorporated herein by reference.

The prior art electrode 20 comprises a cup-shaped body whose open upper end is threaded by screw threads 63 into the coupler 62 at the lower end of the electrode holder 56, and whose capped lower end is closely adjacent the lower end of the coolant tube 64. A coolant circulating space exists between the inner surface of the wall of the electrode 20 and the outer surface of the wall of the coolant tube 64, and between the outer surface of the wall of the coolant tube 64 and the inner surface of the wall of the electrode holder 56. The electrode holder 56 includes a plurality of holes 66 for supplying coolant from the space within the electrode holder to a space 68 between the electrode holder and the inner wall of the axial bore 60 in the insulator body 16. A seal 69 located between the holes 66 and the coupler 62 seals against the inner wall of the bore 60 to prevent coolant in the space 68 from flowing past the seal 69 toward the coupler 62. A raised annular rib or dam 71 on the outer surface of the electrode holder 56 is located on the other side of the holes 66 from the seal 69, for reasons which will be made apparent below. A coolant supply passage 70 (FIG. 2) extends through the insulator body from the space 68 through the outer cylindrical surface of the insulator body 16 for supplying coolant to the nozzle assembly 22, as further described below.

During starting of the torch 10, a difference in electrical voltage potential is established between the electrode 20 and the nozzle tip 48 so that an electric arc forms across the gap therebetween. Plasma gas is then flowed through the nozzle assembly 22 and the electric arc is blown outward from the nozzle exit orifice 50 until it attaches to a workpiece, at which point the nozzle assembly 22 is disconnected from the electric source so that the arc exists between the electrode 20 and the workpiece. The torch is then in a working mode of operation.

For controlling the work operation being performed, it is known to use a control fluid such as a shielding gas to surround the arc with a swirling curtain of gas. To this end, the insulator body 16 includes a shielding gas passage 72 that extends from the upper end face 34 axially into the insulator body, and then angles outwardly and extends through the cylindrical outer surface of the insulator body. A nozzle retaining cup assembly 74 surrounds the insulator body 16 to create a generally annular shielding gas chamber 76 between the insulator body 16 and the nozzle retaining cup assembly 74. Shielding gas is supplied through the shielding gas passage 72 of the insulator body 16 into the shielding gas chamber 76.

The nozzle retaining cup assembly 74 includes a nozzle retaining cup holder 78 and a nozzle retaining cup 80 which is secured within the holder 78 by a snap ring 81 or the like. The nozzle retaining cup holder 78 is a generally cylindrical sleeve, preferably formed of metal, which is threaded over the lower end of a torch outer housing 82 which surrounds the main torch body 14. Insulation 84 is interposed between the outer housing 82 and the main torch body 14. The nozzle retaining cup 80 preferably is formed of plastic and has a generally cylindrical upper portion that is secured within the cup holder 78 by the snap ring 81 and a generally frustoconical lower portion which extends toward the end of the torch and includes an inwardly directed flange 86. The flange 86 confronts an outwardly directed flange 88 on the upper nozzle member 42 and contacts an O-ring 90 disposed therebetween. Thus, in threading the nozzle retaining cup assembly 74 onto the outer housing 82, the nozzle retaining cup 80 draws the nozzle assembly 22 upward into the metal insert sleeve 44 in the insulator body 16. The nozzle assembly 22 is thereby made to contact an electrical contact ring secured within the counterbore 38 of the insulator body 16. More details of the electrical connections within the torch can be found in commonly-owned U.S. Pat. No. 6,215,090, which is incorporated by reference herein in its entirety.

The nozzle retaining cup 80 fits loosely within the cup holder 78, and includes longitudinal grooves 92 in its outer surface for the passage of shielding gas from the chamber 76 toward the end of the torch. Alternatively or additionally, grooves (not shown) may be formed in the inner surface of the cup holder 78. A shielding gas cup 94 of generally frustoconical form concentrically surrounds and is spaced outwardly of the lower nozzle tip 48 and is held by a shield retainer 96 that is threaded over the lower end of the cup holder 78. A shielding gas flow path 98 thus extends from the longitudinal grooves 92 in retaining cup 80, between the shield retainer 96 and the retaining cup 80 and upper nozzle member 42, and between the shielding gas cup 94 and the lower nozzle tip 48.

The shielding gas cup 94 includes a diffuser 100 that in known manner imparts a swirl to the shielding gas flowing into the flow path between the shielding gas cup 94 and the lower nozzle tip 48. Thus, a swirling curtain of shielding gas is created surrounding the jet of plasma gas and the arc emanating from the nozzle exit orifice 50.

With primary reference to FIG. 2, the coolant circuits for cooling the electrode 20 and nozzle assembly 22 are now described. The torch 10 includes a coolant inlet connector tube 112 that extends through the rear insulator body 12 and is secured within a coolant inlet passage 114 in the main torch body 14. The coolant inlet passage 114 connects to the center axial bore 58 in the main torch body. Coolant is thus supplied into the bore 58 and thence into the internal passage through the electrode holder 56, through the internal passage of the coolant tube 64, and into the space between the tube 64 and the electrode 20. Heat is transferred to the liquid coolant (typically water or antifreeze) from the lower end of the electrode (from which the arc emanates) and the liquid then flows through a passage between the lower end of the coolant tube 64 and the electrode 20 and upwardly through the annular space between the coolant tube 64 and the electrode 20, and then into the annular space between the coolant tube 64 and the electrode holder 18.

The coolant then flows out through the holes 66 into the space 68 and into the passage 70 through the insulator body 16. The seal 69 prevents the coolant in the space 68 from flowing toward the coupler 62 at the lower end of the holder 56, and the dam 71 substantially prevents coolant from flowing past the dam 71 in the other direction, although there is not a positive seal between the dam 71 and the inner wall of the bore 60. Thus, the coolant in space 68 is largely constrained to flow into the passage 70. The insulator body 16 includes a groove or flattened portion 116 that permits coolant to flow from the passage 70 between the insulator body 16 and the nozzle retaining cup 80 and into a coolant chamber 118 which surrounds the upper nozzle member 42. The coolant flows around the upper nozzle member 42 to cool the nozzle assembly.

Coolant is returned from the nozzle assembly via a second groove or flattened portion 120 angularly displaced from the portion 116, and into a coolant return passage 122 in the insulator body 16. The coolant return passage 122 extends into a portion of the axial bore 60 that is separated from the coolant supply passage 70 by the dam 71. The coolant then flows between the electrode holder 56 and the inner wall of the bore 60 and the bore 58 in the main torch body 14 into an annular space 126 which is connected with a coolant return passage 128 formed in the main torch body 14, and out the coolant return passage 128 via a coolant return connector tube 130 secured therein. Typically, returned coolant is recirculated in a closed loop back to the torch after being cooled.

In use, and with reference to FIG. 1, one side of an electrical potential source 210, typically the cathode side, is connected to the main torch body 12 and thus is connected electrically with the electrode 20, and the other side, typically the anode side, of the source 210 is connected to the nozzle assembly 22 through a switch 212 and a resistor 214. The anode side is also connected in parallel to the workpiece 216 with no resistor interposed therebetween. A high voltage and high frequency are imposed across the electrode and nozzle assembly, causing an electric arc to be established across a gap therebetween adjacent the plasma gas nozzle discharge. Plasma gas is flowed through the nozzle assembly to blow the pilot arc outward through the nozzle discharge until the arc attaches to the workpiece. The switch 212 connecting the potential source to the nozzle assembly is then opened, and the torch is in the transferred arc mode for performing a work operation on the workpiece. The power supplied to the torch is increased in the transferred arc mode to create a cutting arc, which is of a higher current than the pilot arc.

Example embodiments of the present invention are illustrated in FIGS. 4-15. FIG. 4 shows one example embodiment of a plasma arc torch 300 comprising an electrode holder assembly 318 and novel threaded connection. The electrode holder assembly 318 comprises an electrode holder 356 and an electrode 320. Although illustrated herein with a torch that uses a high-frequency pilot signal to start an arc, the electrode and electrode holder according to the invention can also be used with blowback-type torches.

With reference to FIGS. 4-6, the electrode holder 356 is tubular and comprises an upper end connected by threads 11 within the blind axial bore in the main torch body, as described above, and a lower end connected to the electrode 320. The electrode holder 356 comprises an inner coolant tube 352 and an outer coolant tube 354. The inner coolant tube 352 supplies coolant to the electrode 320. The outer coolant tube 354 is generally tubular shaped and annularly surrounds the inner coolant tube 352. The outer coolant tube 354 is configured to remove coolant from the electrode 320. The electrode holder 356 can be formed from a variety of different electrically conductive materials, but in one embodiment the electrode holder 356 is made of brass or a brass alloy.

The electrode 320, shown in cross-sectional view in FIG. 7 and perspective view in FIG. 7A, is generally cup-shaped. In the depicted embodiment, the electrode 320 comprises an outer wall 335, an end wall 330, and a protrusion 325. The outer wall 335 is generally tubular shaped and, with reference to FIG. 6, may be configured to engage with the electrode holder 356 such that an outer passage 337 is formed between the exterior surface of the inner coolant tube 352 and the interior surface of the outer wall 335, allowing coolant to pass through the outer passage 337 to the outer coolant tube 354. The end wall 330 joins to a distal end of the outer wall 335 and supports an emissive element 332 in a generally central region of the end wall 330. The protrusion 325 extends from the generally central region of the end wall 330 and is configured to connect with the electrode holder 356 by a releasable connection, such as a threaded connection shown in the depicted embodiment. The electrode 320 can be formed from a variety of different electrically conductive materials, but in one embodiment the electrode 320 comprises a body made of copper or a copper alloy.

With reference to FIGS. 6 and 7, threads 310 secure the electrode 320 to the electrode holder 356. In the depicted embodiment, the inner coolant tube 352 of the electrode holder 356 has a female threaded portion 317 formed therein on the interior surface of the inner coolant tube 352. The protrusion 325 of the electrode 320 has a male threaded portion 319 formed thereon on the exterior surface of the protrusion 325. The female threaded portion 317, shown in FIG. 8, may be formed on the lower end of the inner coolant tube 352 and configured to releasably receive the male threaded portion 319 of the protrusion 325. The male threaded portion 319 may comprise threads 310 configured as any type of thread, such as a double start screw thread, a metric screw thread, a unified screw thread, a British standard pipe thread, a Whitworth screw thread, or a screw thread having a stub acme profile as described in U.S. Pat. No. 7,081,597, assigned to assignee of the present invention, and which is hereby incorporated herein by reference. The female threaded portion 317 may also be configured with a thread profile to match a male threaded portion 319 with threads 310 configured as any type of thread, such as those screw threads listed above.

In some embodiments, the protrusion 325 may be further configured such that at least one coolant passage 360 forms between the protrusion 325 and the electrode holder 356 when the electrode 320 is connected to the electrode holder 356. In the depicted embodiment, the male threaded portion 319 and the female threaded portion 317 are configured with extra space between the threads 310 so that coolant can flow between the threads 310. In particular, as shown in FIG. 6, the extra space can form at least one coolant passage 360 between the protrusion 325 and the inner coolant tube 352 of the electrode holder 356. In the depicted embodiment, the coolant passage 360 comprises a helically extending space between the thread profile of the male threaded portion 319 on the protrusion 325 and the thread profile of the female threaded portion 317 on the inner coolant tube 352. Thus, coolant enters the coolant passage 360 from the inner coolant tube 352, spirals around the coolant passage 360 within the threads, and exits the coolant passage 360 to impinge the end wall 330. The coolant then flows into the outer passage 337 and away from the electrode 320 through the outer coolant tube 354. These novel coolant passages 360, which follow the threaded connection of the electrode assembly 318, allow the flowing coolant to contact inner surfaces of the electrode for a greater amount of time relative to an electrode such as shown in FIGS. 1-3. Additionally, higher coolant velocity may be achieved, which will improve convective heat transfer from the electrode to the coolant. The net result should be enhanced cooling of the electrode 320, which in turn should prolong the life of the electrode 320.

In the depicted embodiment, the inner coolant tube 352 of the electrode holder 356 comprises a bottom end 353 extending generally toward the electrode 320. Different configurations of the electrode assembly 318 may require the bottom end 353 of the inner coolant tube 352 to be positioned properly with respect to the electrode 320 for the plasma arc torch to function properly. For example, in some embodiments, an opening 363 may be configured to allow coolant to flow from the coolant passage 360 to the outer passage 337 formed between the inner coolant tube 352 and the outer wall 335 of the electrode 320, thereby allowing the coolant to be ultimately removed from the electrode 320 through the outer coolant tube 354. In the depicted embodiment, the opening 363 is configured as additional space between the bottom end 353 of the inner coolant tube 352 and the end wall 330 of the electrode 320. In some embodiments, this may be accomplished by configuring the female threaded portion 317 to extend only partially up the lower end of the inner coolant tube 352 such that the protrusion 325 can be screwed into the female threaded portion 317 for only a certain distance, ensuring the opening 363 to form. Alternatively or additionally, a stopper (not shown) can be positioned within the female threaded portion 317 to prevent the male threaded portion 319 of the protrusion 325 from being advanced past a certain point (i.e., the position of the stopper), thereby ensuring the opening 363 forms.

Alternatively or additionally, in other embodiments, the opening 363 may comprise a slot (not shown) in the inner coolant tube 352 that connects the coolant passage 360 to the outer passage 337. The slot may be configured adjacent to the bottom of the coolant passage 360 such that coolant flows through the entire coolant passage 360, out of the slot, into the outer passage 337, and up through the outer coolant tube 354. In some embodiments, the slot can allow the coolant to flow through the electrode assembly 318 with greater velocity, improving the convective heat transfer and prolonging the life of the electrode 320.

FIGS. 9-11 show another embodiment of the present invention, wherein an electrode assembly 418 utilizes a double start screw thread for the releasable connection between the electrode 420 and the electrode holder 456. However, the electrode assembly 418 may be used in a plasma arc torch in similar manner as the electrode assembly 318 described above with respect FIGS. 4-8, as well as with other embodiments of the present invention as described herein.

In the depicted embodiment of FIG. 9, the electrode assembly 418 comprises an electrode 420 and an electrode holder 456. The electrode 420 comprises a protrusion 425 with a male threaded portion 419 defined by threads 410 that form a double-start screw thread. The electrode holder 456 comprises an inner coolant tube 452 with a female threaded portion 417 configured with a thread profile that matches the double start screw thread of the male threaded portion 419 to allow for a releasable connection. Furthermore, the thread profile of the male and female threaded portions 419, 417, similar to the male and female threaded portions 319, 317 of the electrode assembly 318, may also form at least one coolant passage 460. In the depicted embodiment, the electrode assembly 418 comprises two coolant passages 460 and 460', formed separately due to the thread profile of the double start screw thread. As such, in some embodiments, coolant may flow through both coolant passages 460, 460' out of respective openings 463, 463' and away from the electrode 420 through the outer coolant passage 454. In the depicted embodiment, the openings 463, 463' comprise slots formed in the inner coolant tube 452.

FIGS. 12-14 show another embodiment of the present invention, wherein the electrode assembly 518 comprises an electrode 520 and an electrode holder 556 having a threaded connection between an exterior surface of an inner coolant tube 552 and an interior surface of a protrusion 525. The electrode assembly 518 may also be used in a plasma arc torch in similar manner as the electrode assembly 318 described with respect to FIGS. 4-8, as well as with other embodiments of the present invention as described herein.

With reference to FIG. 12, the electrode 520 comprises an annularly shaped protrusion 525 having a female threaded portion 517. The electrode holder 556 comprises an inner coolant tube 552 having a male threaded portion 519 comprising threads 510. The thread profile of the male threaded portion 519 and the corresponding female threaded portion 517 may be any type of screw thread, such as a double start screw thread, a metric screw thread, a unified screw thread, a British standard pipe thread, a Whitworth screw thread, or a screw thread having a stub acme profile.

In the depicted embodiment, the inner coolant tube 552 and the central bore of the protrusion 525 define an inner passage 536 configured to allow coolant to flow to the electrode 520. In some embodiments, the inner passage 536 defines a reservoir positioned directly above an end wall 530 and an emissive element 532 contained within the end wall 530. Thus, coolant in the reservoir will directly contact the portion of the electrode 520 with the highest temperature (i.e., the portion near the emissive element 532).

Additionally, in the depicted embodiment, the electrode 520 further comprises at least one passage or slot 576. One end of the slot 576 connects the inner passage 536 to an outer passage 537 defined between the protrusion 525 and the outer wall 535. Therefore, the slot 576 allows coolant to flow from the inner passage 536 to the outer passage 537, so that the coolant can ultimately flow away from the electrode through the outer coolant tube 554 of the electrode holder 556.

FIG. 15 shows another embodiment of an electrode assembly 618 with an electrode holder 656 and an attached electrode 620. In the depicted embodiment, the electrode 620 comprises a tubular outer wall 635 that extends past the protrusion 625. Coolant can flow through the inner coolant tube 652 of the electrode holder 656 and around the protrusion 625 to cool the electrode 620, as described in various embodiments above. Furthermore, the coolant can flow between the exterior surface of the inner coolant tube 652 and the interior surface of the outer wall 635 to the outer coolant tube 654 for removal from the electrode 620.

Another embodiment of the present invention includes a method for cooling an electrode in a plasma arc torch comprising providing coolant to the electrode through various embodiments of the invention as described herein. In particular, the method may comprise the steps of connecting an electrode to an electrode holder by a releasable connection therebetween, the electrode having an end wall supporting an emissive element and a protrusion extending from a generally central region of the end wall, the protrusion being configured to connect with the electrode holder by the releasable connection. The method may further comprise providing coolant through a coolant tube of the electrode holder and through at least one coolant passage defined by the releasable connection such that the end wall of the electrode is impinged by the coolant. In some embodiments, the method may further comprise removing coolant from the at least one coolant passage through at least one slot adjacent to the coolant passage. The method may also further comprise removing coolant from the electrode through an outer coolant tube defined in the electrode holder. In other embodiments, the step of providing coolant through the at least one coolant passage comprises passing coolant through a helically extending space between a thread profile on the protrusion of the electrode body and a thread profile on the coolant tube of the electrode holder.

Embodiments of the present invention as described herein address releasable connections and the issue of heat transfer for electrode cooling methods. In particular, some embodiments utilize cooling passages formed between the thread profile of the electrode and the inner coolant tube of the electrode holder to increase coolant flow velocity and increase the surface area used for heat transfer between the electrode and the coolant. Other embodiments described herein also advantageously utilize slots to facilitate coolant flow. In fact, the combination of the coolant passages and the slots has shown to increase flow velocity by three fold. Thus, embodiments of the present invention improve heat transfer by increasing flow velocity and increasing the surface area of the electrode that interacts with the coolant, thereby increasing the useable life of the electrode in a plasma arc torch.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included herein. Although specific terms are employed herein, they are used in a generic and descriptive sense only and not for purposes of limitation.

What is claimed is:

1. An electrode for a plasma arc torch, the electrode comprising:
   a generally tubular outer wall;
   an end wall joined to a distal end of the outer wall and supporting an emissive element in a generally central region of the end wall;
   a protrusion extending from the generally central region of the end wall, the protrusion centrally disposed within the generally tubular outer wall, the protrusion comprising threads for securing the electrode to threads of an electrode holder; and
   a coolant passage formed between the protrusion and the electrode holder when the electrode is connected with the electrode holder.

2. The electrode of claim 1, wherein the protrusion threads comprise female threads for securing the electrode to male threads of the electrode holder.

3. The electrode of claim 1, wherein the coolant passage comprises a slot.

4. The electrode of claim 3, wherein the slot comprises a radially disposed opening coupling an inner passage of the protrusion to an outer passage of the protrusion.

5. The electrode of claim 4, wherein the slot comprises a plurality of radially disposed openings coupling the inner passage of the protrusion to an outer passage of the protrusion, the plurality of radially disposed openings positioned in spaced apart relation about a circumference of the protrusion.

6. The electrode of claim 1, wherein at least a portion of the coolant passage is defined by the threaded connection between the electrode and the electrode holder.

7. The electrode of claim 1, wherein the threaded connection is configured as one of a double start screw thread, a metric screw thread, a unified screw thread, a British standard pipe thread, a Whitworth screw thread, and a screw thread having a stub acme profile.

8. The electrode of claim 1, wherein the protrusion is further configured such that a gap forms between the end wall and the coolant tube of the electrode holder when the electrode is connected to the electrode holder.

9. The electrode of claim 1, wherein the protrusion is annular and comprises an interior surface, and wherein at least a portion of the interior surface of the protrusion is configured to connect with the coolant tube of the electrode holder by the threaded connection.

10. An electrode assembly for a plasma arc torch, comprising:
   an electrode comprising; a generally tubular outer wall;
   an end wall joined to a distal end of the outer wall and supporting an emissive element in a generally central region of the end wall; and
   a protrusion extending from the generally central region of the end wall, at least a portion of the protrusion being centrally disposed within the generally tubular outer wall of the electrode; and
   an electrode holder connected to the electrode, the electrode holder comprising:
      an inner coolant tube for providing coolant to the electrode; and
      an outer coolant tube surrounding the inner coolant tube for removing coolant from the electrode via a space between the inner and outer coolant tubes;
   wherein the protrusion of the electrode includes threads for connecting with threads of the inner coolant tube of the electrode holder,
   wherein a coolant passage is formed between the protrusion and the electrode holder when the electrode is connected with the electrode holder.

11. The electrode assembly of claim 10, wherein the protrusion threads comprise female threads for securing the electrode to male threads of the electrode holder.

12. The electrode assembly of claim 10, wherein the coolant passage comprises a slot.

13. The electrode assembly of claim 12, wherein the slot comprises a radially disposed opening coupling an inner passage of the protrusion to an outer passage of the protrusion.

14. The electrode assembly of claim 13, wherein the slot comprises a plurality of radially disposed openings coupling the inner passage of the protrusion to an outer passage of the protrusion, the plurality of radially disposed openings positioned in spaced apart relation about a circumference of the protrusion.

15. The electrode assembly of claim 10, wherein the protrusion is annular and comprises an interior surface, and wherein at least a portion of the interior surface of the protrusion is configured to connect with the coolant tube of the electrode holder by the threaded connection.

16. The electrode assembly of claim 10, wherein the protrusion is further configured such that a gap forms between the end wall and the coolant tube of the electrode holder when the electrode is connected to the electrode holder.

17. A method for cooling an electrode in a plasma arc torch, comprising the steps of:
   connecting an electrode to an electrode holder by a threaded connection therebetween, the electrode having an end wall supporting an emissive element and a protrusion extending from a generally central region of the end wall, the protrusion centrally disposed within a generally tubular outer wall of the electrode, the protrusion including threads for securing the electrode to threads of the electrode holder; and
   providing coolant through a coolant tube of the electrode holder and through at least one coolant passage defined between the protrusion and the electrode holder such that the end wall of the electrode is impinged by the coolant.

18. The method of claim 17, wherein the coolant passage comprises a slot, the method comprising moving coolant through the slot.

19. The method of claim 17, further comprising removing coolant from the electrode through an outer coolant tube defined in the electrode holder.

20. The method of claim 17, wherein the coolant passage comprises a plurality of radially disposed slots, the method comprising moving coolant through the plurality of slots such that the end wall of the electrode is impinged by the coolant.

* * * * *